(12) United States Patent
Ganti et al.

(10) Patent No.: US 8,458,413 B2
(45) Date of Patent: Jun. 4, 2013

(54) SUPPORTING VIRTUAL INPUT/OUTPUT (I/O) SERVER (VIOS) ACTIVE MEMORY SHARING IN A CLUSTER ENVIRONMENT

(75) Inventors: Veena Ganti, Austin, TX (US); James A. Pafumi, Leander, TX (US); Jacob Jason Rosales, Austin, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/913,190

(22) Filed: Oct. 27, 2010

(65) Prior Publication Data
US 2012/0110275 A1    May 3, 2012

(51) Int. Cl.
  *G06F 13/00*  (2006.01)
  *G06F 13/28*  (2006.01)
(52) U.S. Cl.
  USPC ............... 711/153; 711/E12.002; 707/655; 707/821; 718/1; 718/104
(58) Field of Classification Search
  USPC ....... 711/153, E12.002; 707/655, 821; 718/1, 718/104
  See application file for complete search history.

(56) References Cited

U.S. PATENT DOCUMENTS

| | | | |
|---|---|---|---|
| 2009/0307377 A1 | 12/2009 | Anderson | |
| 2009/0307396 A1 | 12/2009 | Nogueras | |
| 2009/0307438 A1* | 12/2009 | Logan et al. | 711/153 |
| 2009/0307688 A1 | 12/2009 | Pafumi | |
| 2012/0054746 A1* | 3/2012 | Vaghani et al. | 718/1 |

* cited by examiner

*Primary Examiner* — Edward Dudek, Jr.
(74) *Attorney, Agent, or Firm* — Yudell Isidore Ng Russell PLLC

(57) ABSTRACT

A method, system, and computer program product provide a shared virtual memory space via a cluster-aware virtual input/output (I/O) server (VIOS). The VIOS receives a paging file request from a first LPAR and thin-provisions a logical unit (LU) within the virtual memory space as a shared paging file of the same storage amount as the minimum required capacity. The VIOS also autonomously maintains a logical redundancy LU (redundant LU) as a real-time copy of the provisioned/allocated LU, where the redundant LU is a dynamic copy of the allocated LU that is autonomously updated responsive to any changes within the allocated LU. Responsive to a second VIOS attempting to read a LU currently utilized by a first VIOS, the read request is autonomously redirected to the logical redundancy LU. The redundant LU can be utilized to facilitate migration of a client LPAR to a different computing electronic complex (CEC).

20 Claims, 9 Drawing Sheets

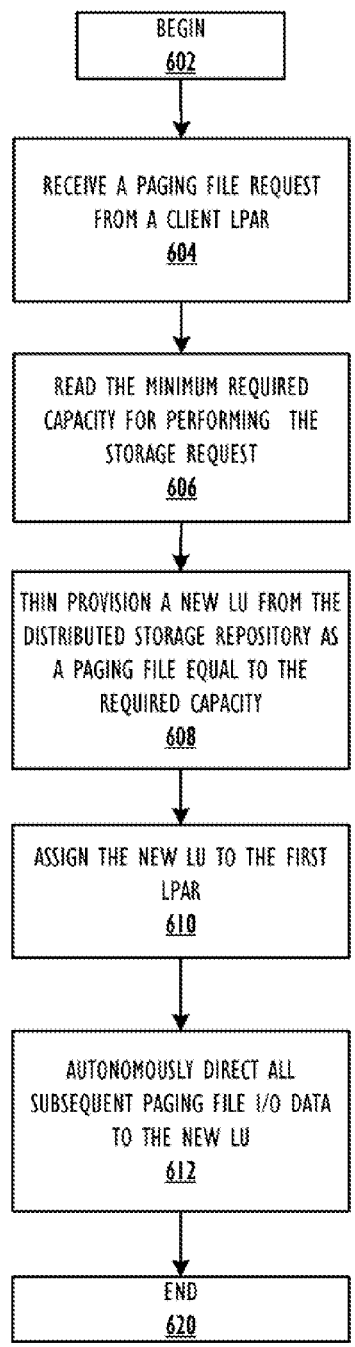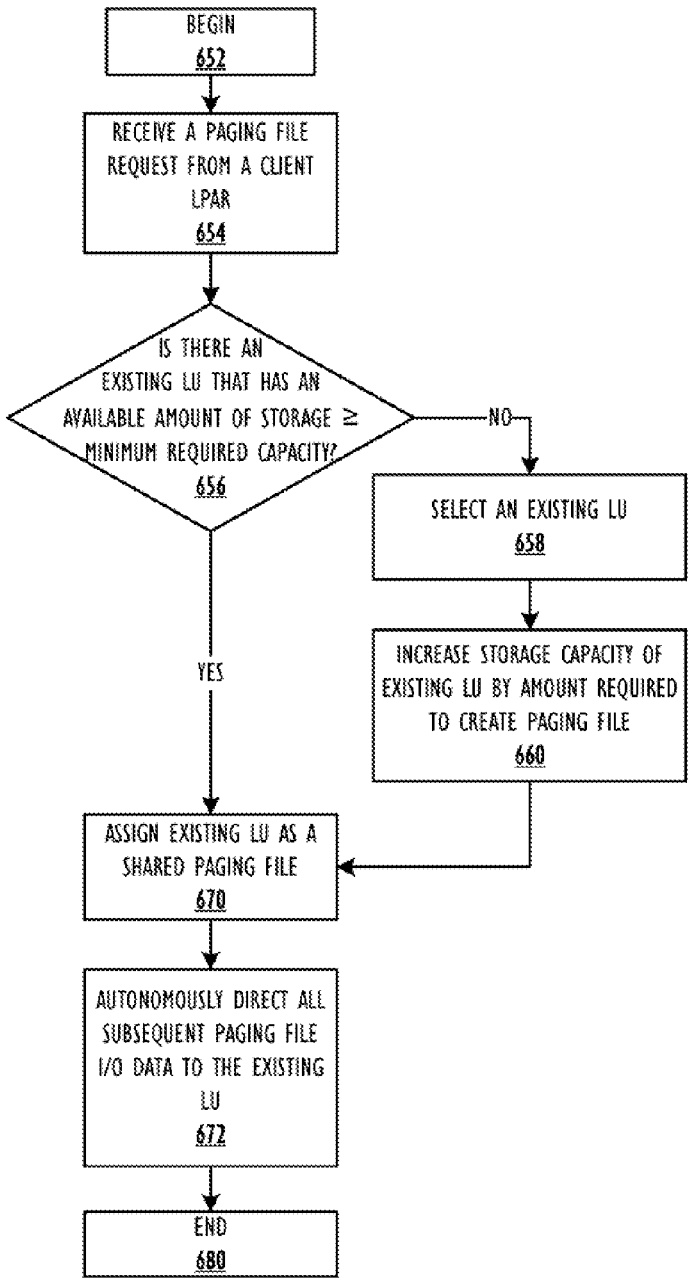

SUPPORTING VIRTUAL INPUT/OUTPUT (I/O) SERVER (VIOS) ACTIVE MEMORY SHARING IN A CLUSTER ENVIRONMENT

BACKGROUND

1. Technical Field

The present invention relates in general to clustered data processing systems and in particular to management and utilization of shared storage within a clustered data processing system. Still more particularly, the present invention relates to an improved method and system for providing active memory sharing of logical units in a distributed storage repository.

2. Description of the Related Art

Large scale, distributed data processing systems are known in the art. As cloud computing becomes more and more ubiquitous in the computer world, methods for providing enhanced functionality and greater up-time are required to continue to adequately serve commercial needs.

Today, storage virtualization and management is a separate entity than server virtualization and management. Different clients logical partitions (LPARs) associated with different servers access the same SAN storage. A client's LPARs on one server may not know if the SAN disk that it is trying to access is being used by some another client's LPAR belonging to some other server. This can cause data integrity issues and may potentially cause data corruption and client partition crashes. This problem is exacerbated for memory sharing and remote hibernation solutions.

Additionally, in a typical storage virtualization environment each client is allocated a specified amount of storage. Regardless of whether the client uses all or only a small portion of the allocated amount, the allocated amount remains reserved. Currently, for active memory sharing (AMS), network storage (e.g., SAN) devices are used as paging devices. The number of paging devices that can be supported and thus the number of client partitions that can be Active Memory Sharing (AMS) clients is completely dependent on the number of storage devices that are accessible and are available (free). As both the AMS clients and dedicated memory clients that need to be able to "hibernate" increase, the requirement on the number of paging devices that are required increases rapidly. Additionally, the size of each storage device needs to be sufficient to satisfy the AMS client's memory requirements and/or be big enough to completely contain the hibernation image. This requires a very large amount of storage and also results in highly inefficient use of the large amount of storage since many devices, especially active memory sharing (AMS) devices, will typically only use a small amount of space when running and only very rarely use the full capacity, or when full capacity is needed it may only be required for a temporary amount of time.

SUMMARY OF AN EMBODIMENT

Disclosed are a method, system, and computer program product that provide a shared virtual memory space via a cluster-aware virtual input/output (I/O) server (VIOS). The VIOS receives a paging file request from a first LPAR and thin-provisions a logical unit (LU) within the virtual memory space as a shared paging file of the same storage amount as the minimum required capacity. The VIOS also autonomously maintains a logical redundancy LU (redundant LU) as a real-time copy of the provisioned/allocated LU, where the redundant LU is a dynamic copy of the allocated LU that is autonomously updated responsive to any changes within the allocated LU. Responsive to a second VIOS attempting to read a LU currently utilized by a first VIOS, the read request is autonomously redirected to the logical redundancy LU. The redundant LU can be utilized to facilitate migration of a client LPAR to a different computing electronic complex (CEC).

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein:

FIG. 6A is a high level logical flowchart of the process for creating a new LU as an active memory sharing paging file, according to one embodiment;

FIG. 6B is a high level logical flowchart of the process for allocating an existing LU as an active memory sharing paging file, according to one embodiment.

DETAILED DESCRIPTION

Figure 1A:
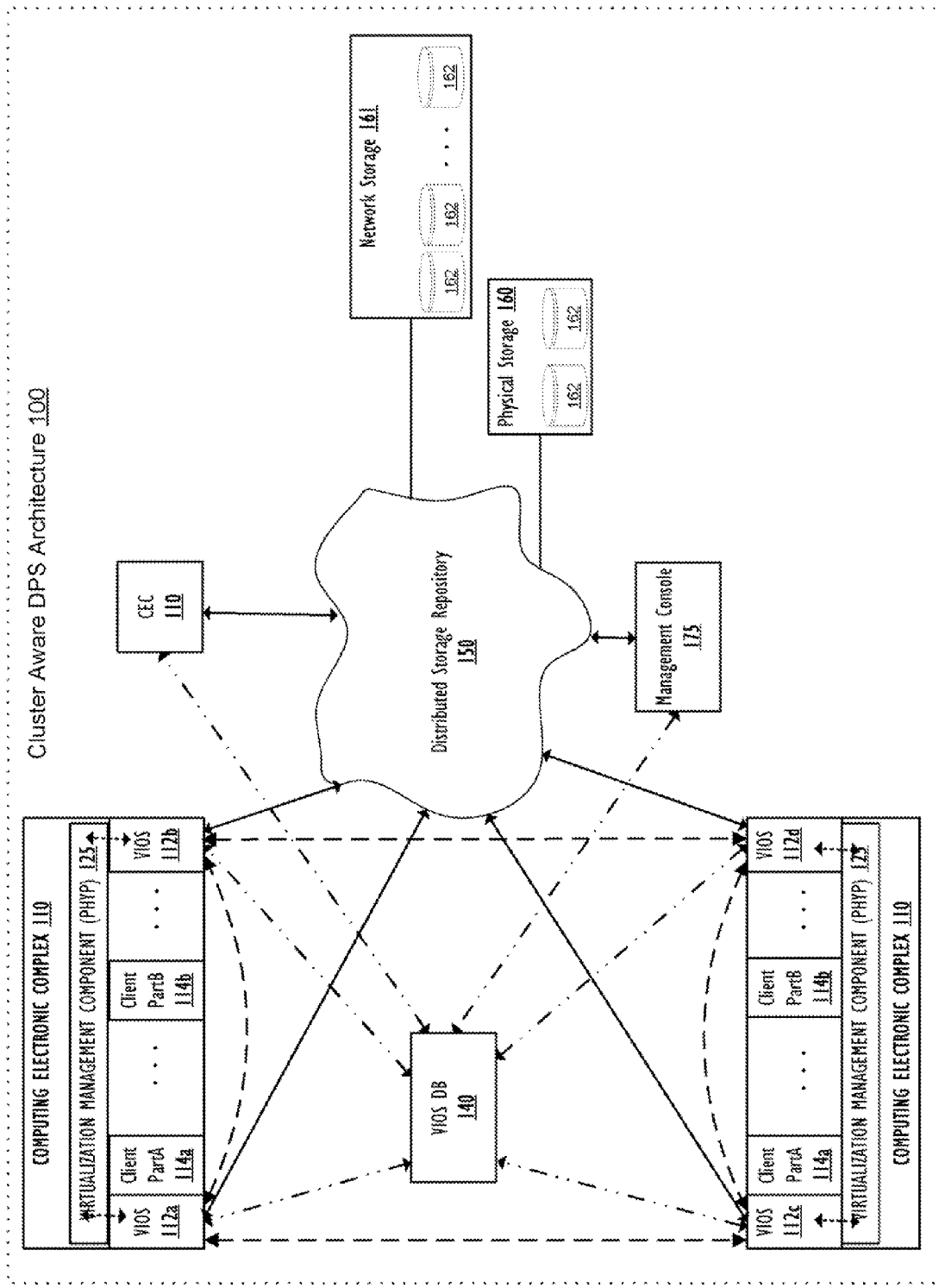
FIG. 1A illustrates a first view of a cluster (aware) data processing system within which various of the functional features of the described embodiments are implemented, according to one embodiment.

The illustrative embodiments provide a method, data processing system, and computer program product that enables active memory sharing of client logical partitions (LPARs) for logical units in a cluster storage. The method is performed within a clustered, data processing system (DPS) environment/architecture in which one or more cluster-aware virtual input/output server (VIOS) enable efficient, secure access for a client logical partition (LPAR) to a single shared, network storage resource of the cluster. The client LPAR and VIOS are located on a computing electronic complex (CEC), which is a computing node within the cluster environment.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
B. Cluster-Aware VIOS
C. VIOS Cluster and Client Mobility
D. Active Memory Sharing in a VIOS Cluster Environment A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. As shown, each VIOS 112 has a universally unique identifier (UUID) associated with the particular VIOS. Thus, no two VIOSes within the entire DPS 100 has a same UUID, and each new VIOS added to the DPS 100 is provided with a new UUID. While presented with some sense of a sequence of allocation within FIG. 1A, in one or more embodiments, the UUIDs of VIOSes within a same CEC 110 are not necessarily sequential to or associated with each other or to the CEC, and a system wide UUID allocation scheme may be implemented that results in a non-sequential allocation across VIOSes within multiple CECs 110. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
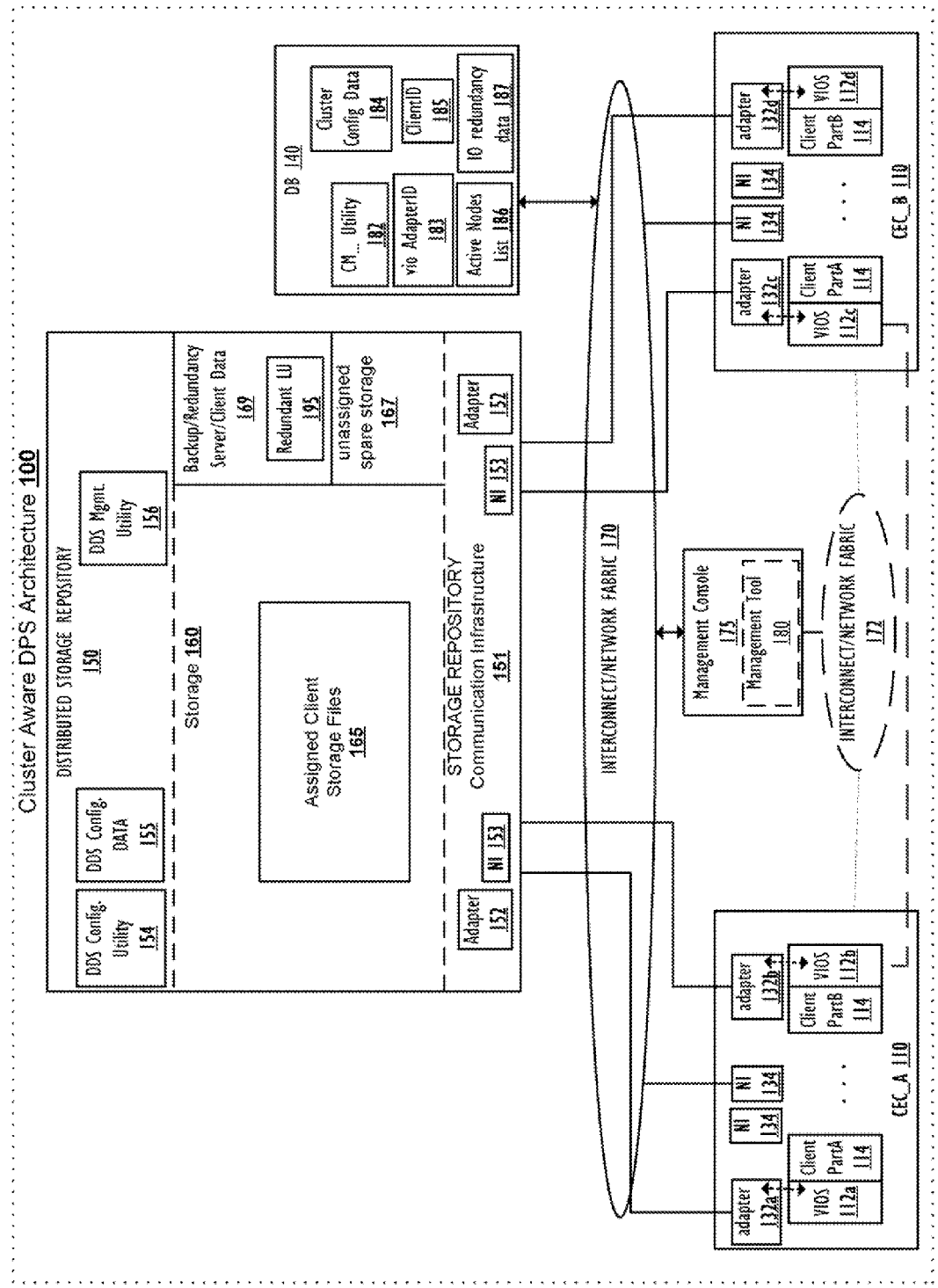
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Figure 1C:
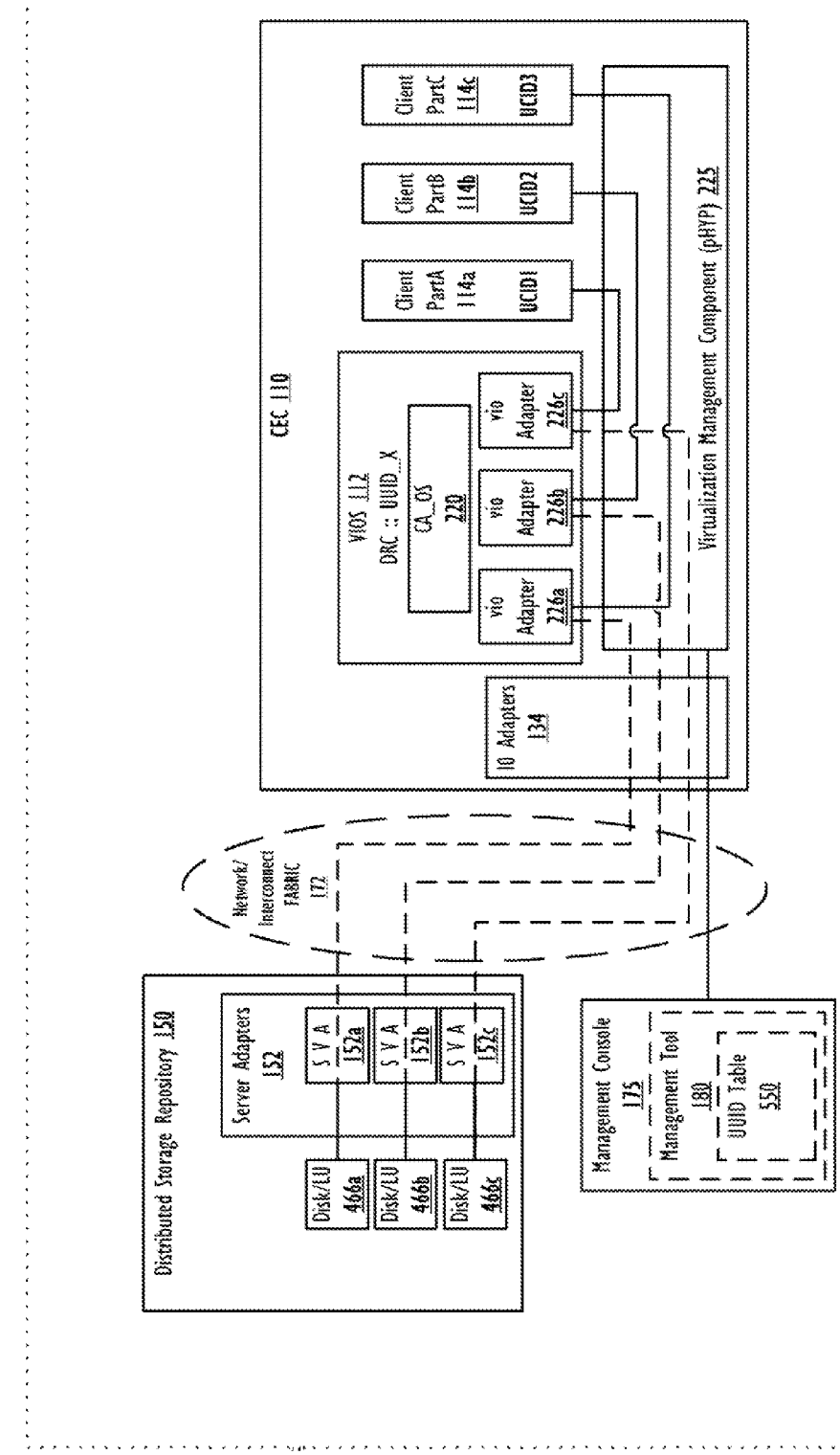
FIG. 1C illustrates a third view of the cluster data processing system (DPS) of FIG. 1A depicting virtual IO connectivity from client logical partitions (LPARs) to assigned client logical units or disks, according to one or more embodiments.

As depicted, each CEC 110 comprises one or more network interfaces 134 and one or more I/O adapters 132 to enable the CEC 110 and thus the other components (i.e., client partitions) of the CEC 110 to engage in network level communication, as illustrated by FIG. 1C. As illustrated within FIG. 1C, within an example virtual I/O architecture 190, each VIOS 112 emulates virtual client I/O adapters 226a-22c to enable communication by specifically-assigned client LPARs 114a-114c with distributed storage repository 150 and/or VIOS DB 140 and/or other clients, within the same CEC or on a different CEC. The VIOSes 112 emulate these virtual I/O adapters 226a-226c and communicates with distributed storage repository 150 by connecting with corresponding virtual sever I/O adapters (SVA) 152a-152c at distributed storage repository 150. In various embodiments, these pairings of virtual client I/O adapters with specific SVAs are unique for each client LPAR 114 to enable each client LPAR 114 to have secure access to the specific storage location (366) assigned to that client LAPR 114. Internal CEC communication between VIOS 112 and client LPARs 114a-114c are illustrated with solid connecting lines, which are routed through the virtualization management component, while VIOS to server communication is provided by dashed lines, which connect via the network/interconnect fabric 172. The VIOSes 112 within each CEC 110 are thus able to support client level access to distributed storage 150 and enable the exchange of system level and client level information with distributed storage repository 150. Each client LPAR 114 has a unique client identifier (UCID). Also, each VIOS 112 has a specific DRC identifying the network location or address of the VIOS (or resources within the VIOS 112). Additionally, each VIOS has a universally unique identifier (UUID), which is associated with that particular VIOS configuration. Also shown by FIG. 1C is the connection of the management console 175, which is utilized to perform the setup and/or initialization of the backup and restore operations described herein for the individual VIOSes 112 and/or for the OS cluster as a whole, in various embodiments. Included within management console 175 and as utilized in the described embodiments, is management tool 180, which has access to and/or a copy of VIOS UUID Table 550.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

Also illustrated by FIG. 1B is an initial view of the component make-up of an example distributed storage repository 150 and an initial listing of some components of DB 140. To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters 152*a-c* (see FIG. 1C), which are paired with respective virtual I/O adapters 226*a-c* (via emulation of physical I/O adapters 132) that are assigned to specific clients 114*a*-114*c* of CECs 110.

Figure 4:
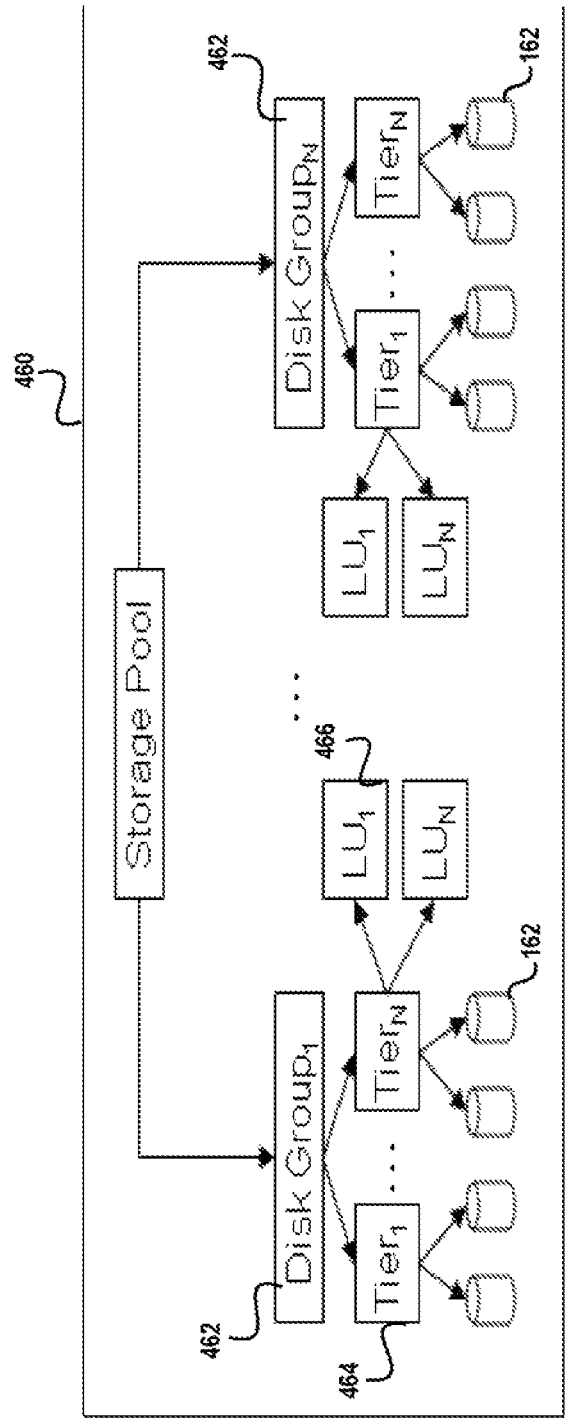
FIG. 4 illustrates an example shared storage pool utilized for storage I/O functions of the VIOSes, according to one embodiment.

As shown, distributed data store 150 generally comprises general storage space 160 (the available local and network storage capacity that may be divided into storage pools) providing assigned client storage 165 (which may be divided into respective storage pools for a group of clients), unassigned, spare storage 167, and backup/redundant CEC/VIOS/client configuration data storage 169. In one embodiment, the assigned client storage is allocated as storage pools, and several of the features related to the sharing of a storage resource, providing secure access to the shared storage, and enabling cluster-level control of the storage among the VIOSes within a cluster are supported with the use of storage pools. When implemented within a VIOS cluster, storage pools provide a method of logically organizing one or more physical volumes for use by the clients supported by the VIOSes making up the VIOS cluster. FIG. 4 illustrates an example configuration of a storage pool utilized within a cluster aware DPS 100. Specifically, FIG. 4 provides details on how these physical volumes are used within the storage pool. As shown, storage pool 460 within the cluster contains one or more Disk Groups 462. Disks Groups 462 provide administrators the ability to provide access policies to a given subset of physical volumes 162 within the storage pool 460. Once a disk group 462 has been defined, administrators can further categorize the subset into Storage Tiers 464 based on disk characteristics. Once a Disk Group 462 and Storage Tier 464 have been defined, administrators carve Logical Units (LU) 162 to be exported to client partitions (114).

With the capability of virtual pooling provided herein, an administrator allocates storage for a pool and deploys multiple VIOSes from that single storage pool. With this implementation, the storage area network (SAN) administration functions is decoupled from the system administration functions, and the system administrator can service customers (specifically clients 114 of customers) or add an additional VIOS if a VIOS is needed to provide data storage service for customers. The storage pool may also be accessible across the cluster, allowing the administrator to manage VIOS work loads by moving the workload to different hardware when necessary. With the cluster aware VIOS implementation of storage pools, additional functionality is provided to enable the VIOSes to control access to various storage pools, such that each client/customer data/information is secure from access by other clients/customers. One such functionality is the allocation to each client LPAR of individual virtual I/O (VIO) adapters having unique adapter identifiers (AdapterID), as presented in the descriptions of the embodiments herein.

Returning now to FIG. 1B, located within backup/redundancy data storage 169 of distributed storage repository (DSR) 150 are one or more redundant LUs 195. Specific functionality of these redundant LUs 195 and the method by which the redundant LUs 195 are created, as well as how the redundant LUs 195 are utilized is provided (or described) in greater detail in Section D of the present disclosure.

As illustrated, DSR 150 further comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, DPS 100 also comprises VIOS database (DB) 140, in which is stored various data structures generated during set up and/or subsequent processing of the VIOS cluster-connected processing components (e.g., VIOSes and management tool). VIOS DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. Also included is a copy of VIOS backup file 650, in the illustrative embodiment. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various presented embodiments.

The various data structures illustrated by the figures and/or described herein are created, maintained and/or updated, and/or deleted by one or more operations of one or more of the processing components/modules described herein. In one embodiment, the initial set up of the storage pools, VIOS DB 140 and corresponding data structures is activated by execution of a management tool 180 to roll out the installation and activation of a plurality of cluster aware operating systems by and/or on one or more VIOSes 112. Once the infrastructure has been established, however, maintenance of the infrastructure, including expanding the number of nodes, where required, is performed by the VIOSes 112 in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then be utilized to activate/initiate, assist with and/or perform one or more of the below described cluster creation, monitoring and management functions, including migration functions utilizing the availability of the resources provided by the CA-OS, the DB 140 and distributed storage repository 150.

In an alternate embodiment, management tool 180 is an executable module that is executed within a client partition at one of the CECs within DPS 100. In one embodiment, the management tool 180 controls some of the operations of the cluster and enables each node within the cluster to maintain current/updated information regarding the cluster, including providing notification of any changes made to one or more of the nodes within the cluster. In one embodiment, management tool 180 registers with a single VIOS 112b and is thus able to retrieve/receive cluster-level data from VIOS, including FFDC data (191) of the entire cluster. In one implementation, the management tool 180 the VIOS with which the management tool 180 registers is a primary node of the cluster. In the embodiments detailed herein, management tool 180 can support the completion of a migration operation of a client from a first CEC to a second CEC, where a redundant logical unit is provisioned as the primary LU for the migrated client at the second CEC, as defined in greater details in Section D below.

Figure 2:
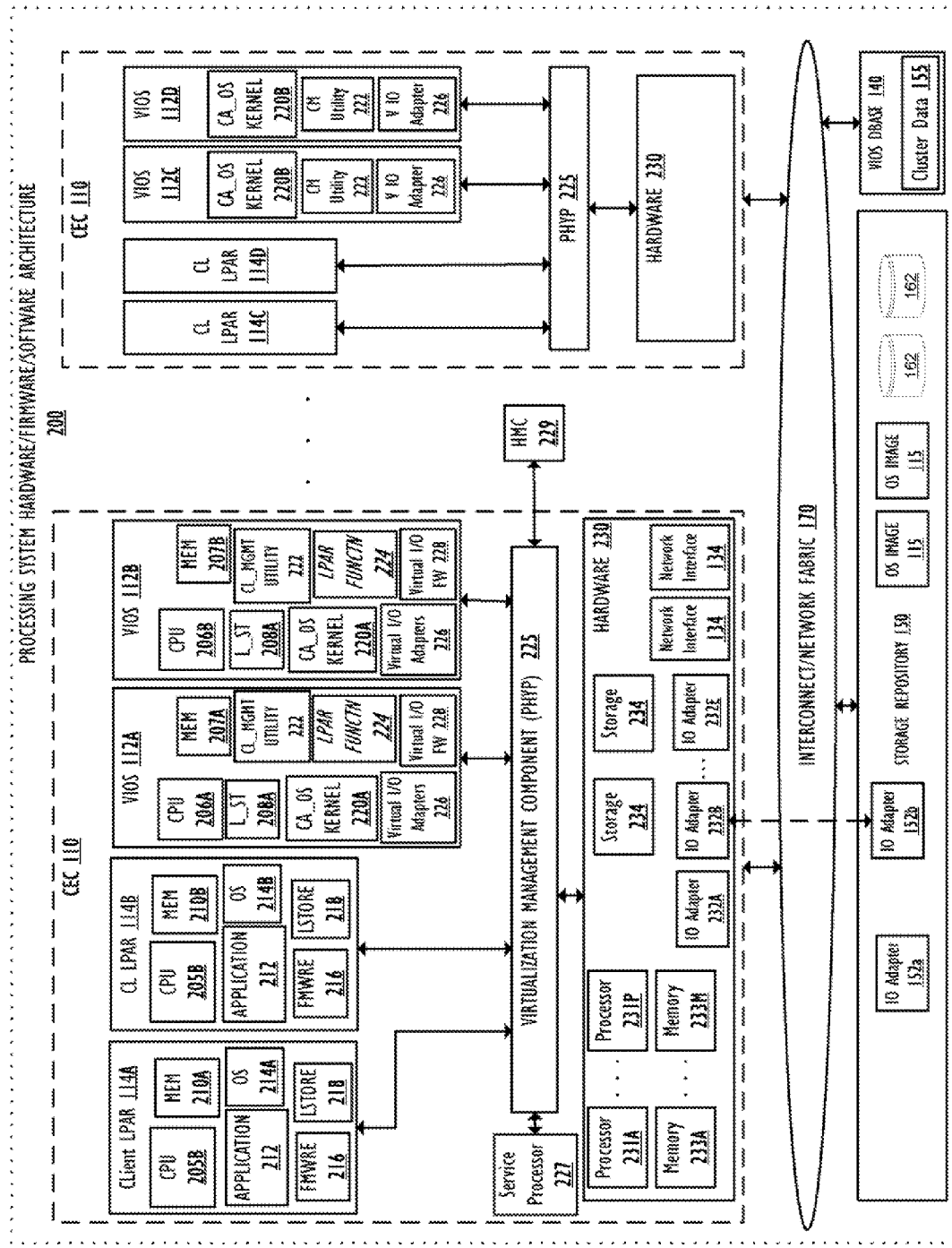
FIG. 2 illustrates an internal configuration of a computing electronic complex (CEC) within the cluster DPS having virtualized OS partitions, including virtual I/O server (VIOS) partitions with functional components that enable cluster awareness, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running.

With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

Figure 3:
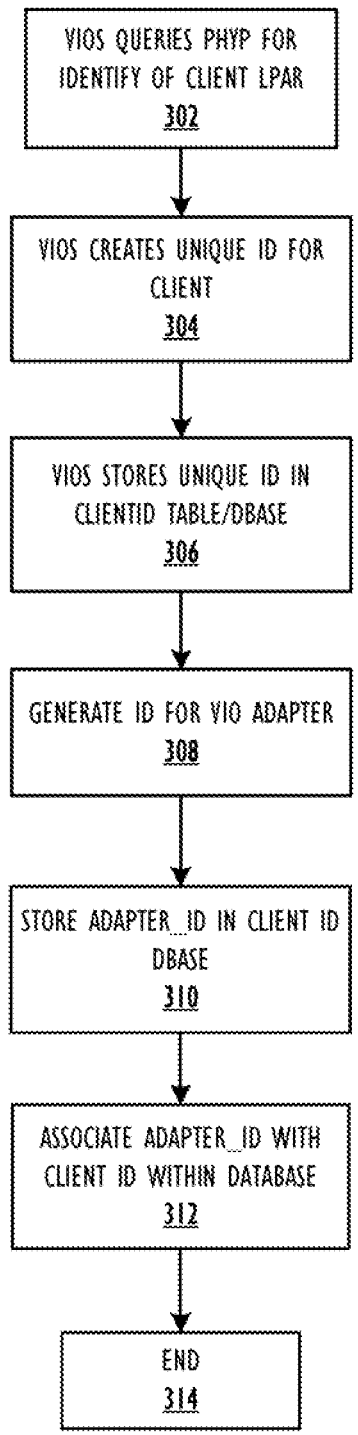
FIG. 3 is a flow chart of the method by which the process of client creation and registration is completed within a CA_DPS, according to one embodiment.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 3 is a flow chart illustrating the method by which a VIOS 112 on a CEC 110 with DPS 100 enables cluster level communication between a client LPAR 114 and distributed storage repository 150, according to one embodiment. The process begins at block 302 at which the VIOS 112 queries PHYP 225 for the identity of the client LPAR 114. At block 304, the VIOS 112 creates a unique identifier (ID) for the client (i.e., a ClientID). The VIOS 112 then stores the unique ClientID in ClientID data structure 159 (FIG. 1B) within DB 140 (block 306). The DB 140 and by extension the ClientID data structure 159 are accessible to each VIOS partition in the cooperating cluster (DPS 100). At block 308, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapterID data structure 158 (block 310) and are associated with their corresponding clientIDs (block 312). The method illustrated by FIG. 3 ends at termination block 314, with each clientID having been associated with the corresponding one or more vio AdapterIDs with DB 140.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. VIOS Cluster and Client Mobility

According to one or more embodiments, the algorithms/functional software modules provided by CM utility 222 also account for the VIOS moving from a first CEC, referred to herein as the source CEC, to a second CEC, referred to herein as the destination CEC. One of the roles played by the VIOS in enable performance of a mobility operation within the cluster aware DPS 100 is to describe the storage that is in use on the source CEC to the VIOS on the destination CEC. The description provide by the first VIOS 112a includes a key into the adapter table 425 for the source adapter. The key is utilized to find the client (114) and unique AdapterID information, based on the data base relationship (e.g., the association of data structures (e.g., tables) within the database). The unique AdapterID is passed to the kernel extension, which verifies storage access. The PHYP signals the termination of the mobility operation, and as part of that completion, the row within the VIOS table is updated with the new CEC relative identifier. Thus, while the move of the particular LPAR is completed, the unique AdapterID assigned to that OS partition is not changed within the database (distributed storage repository). The CEC relative identifier allows the VIOS to be discovered, while the unique AdapterID allows secure implementation of storage pool access rights. This scheme allows flexibility in the management tools implementation for pool security allowing for convenience of use by the system administrator.

In one or more embodiments, conditions may require a client to be migrated to a different CEC and/or to be handled by a different VIOS, while an existing VIOS continued to handle I/O operations in the interim (during the migration). Examples of scenarios that my trigger these client moves/transfers include, but are not limited to: (a) fabric connectivity losses and enable the I/O operations to proceed via redundant VIOS connectivity within the VIOS cluster; (b) hardware issues; and/or (c) manually triggered transfer of the client to other machines/servers by a system administrator. The below described embodiments thus apply to communication loss that is a physical fabric loss, as well as situations in which the first VIOS 112A itself fails or has an internal error condition that prevents the first VIOS 112A from being able to provide/fulfill the I/O operations to/of the client LPAR 114. In one scenario, the loss may be software related. In another embodiment, a third type of fabric loss, which is a loss of VIOS fabric connection to/with VIOS DB 140 may also trigger move of a client. When a move of a client is performed, consideration has to be given to the virtual adapter pairings that enable the client to access the specific client-assigned LU and general distributed storage. These pairings can be transferred as a part of the migration. However, according to one embodiment presented herein, migration of a client can be completed more efficiently utilizing features related to AMS, as described below.

As introduced above, with advanced VIOS implementation, a distributed storage configuration across clustered VIOS partitions is supported by distributed storage repository 150. In other words, distributed storage repository 150 is treated as a one big storage pool, with chunks of physical storage (logical units or LUs) allocated to each client LPAR. In one or more embodiments, each VIOS within the cluster (DPS 100) can be considered a node in the cluster. Each VIOS is able to communicate with other VIOSes utilizing an established communication protocol. If two or more client LPARs belonging to different CECs share storage on the SAN (distributed storage repository 150), implementation of the VIOS communication protocol makes it possible to query each VIOS about the current usage of the shared storage device and disseminate this information to other VIOSes within the cluster. This shared communication enables each VIOS to know whether or not the SAN storage device (distributed storage repository 150) that the VIOS is trying to access is currently being used by some other LPAR, and thus prevent data corruption and possible VIOS and/or client crashes.

D. Active Memory Sharing in a VIOS Cluster Environment

With the above described configurations of a DPS 100 configured with distributed storage repository 150, DB 140, and CECs 110 having VIOSes that are clustered and/or cluster aware through use of DB 140, additional embodiments are provided to enable efficient storage virtualization and management utilizing the VIOSes 112 described above. Implementation of these additional embodiments may involve additional functional components (utilities) of the CA_OS 220 and/or specifically CM utility 222. According to one or more embodiments, the CM utility 222 also enables active memory sharing of a same storage device within the distributed storage repository by one or more VIOSes 112. Within the distributed storage repository, all the storage devices are virtualized into a large storage pool where chunks of storage units (logical units (LUs)) can be carved out and assigned as paging devices for each client. Each client is able to utilize an assigned logical unit (LU) as a paging file thereby facilitating sharing of the storage device and reducing wastage. PHYP 225 provides an interface between a client LPAR and a VIOS and performs various storage I/O operations such as moving or pulling data for one or more VIOSes 112 accessing the LUs. A same logical unit (LU) may be used/accessed by one or more client LPARs 114 owned by the same client via one or more VIOSes 112 of one or more CECs 110. For security purposes, however, a client is unable to access a LU belonging to another client, and a single LU is not shared between different clients.

In one implementation, certain functional components of CM utility 222 are encoded on local device storage accessible to corresponding VIOS 112. VIOS 112 is able to immediately register with the cluster and retrieve/download, or have forwarded from DB 140 (on successful registration with the cluster), the necessary CM software, information, and/or data the VIOS utilizes to become cluster aware when the VIOS is initially activated within the CEC 110. In addition to the locally stored software components of CM utility 222, other functional components of CM utility 222 may be downloaded from DB 140 when CEC is powered on or when one or more VIOSes 112 and/or one or more new client LPARs 114 are enabled on CEC 110. CM utility 222 may comprise firmware and/or specially stored OS code on the CEC that allows for cluster specific boot up and/or setup of a VIOS within the cluster.

CM utility 222 provides code/program instructions that are executed on one or more virtual processor resources of one or more VIOSes 112 within CEC 110 to provide specific functions. Among the functionality provided by CM utility 222 when executed and which are described in greater details herein are the following non-exclusive list: (1) providing, by a first VIOS, a virtual memory space of a distributed storage repository, wherein the virtual memory space is actively shared by two or more client logical partitions (LPARs); (2) the first VIOS receiving a paging file request from an application running on a first client LPAR of the two or more client LPARs, wherein the paging file request indicates a minimum required capacity, and wherein the minimum required capacity is a minimum amount of paging file storage required by the application; (3) determining if an existing logical unit (LU) of a plurality of LUs within the distributed storage repository that has an available amount of storage equal to or greater than the minimum required capacity and is not currently being utilized by a VIOS; (4) in response to determining that the existing LU has an available amount of storage that is at least equal to the minimum required capacity and is not currently being utilized, assigning the existing LU to the first LPAR as a shared paging file, and (5) the first VIOS autonomously directing all subsequent paging file requests of the application to available storage within the existing LU.

D1. Paging File Active Memory Sharing

Figure 5:
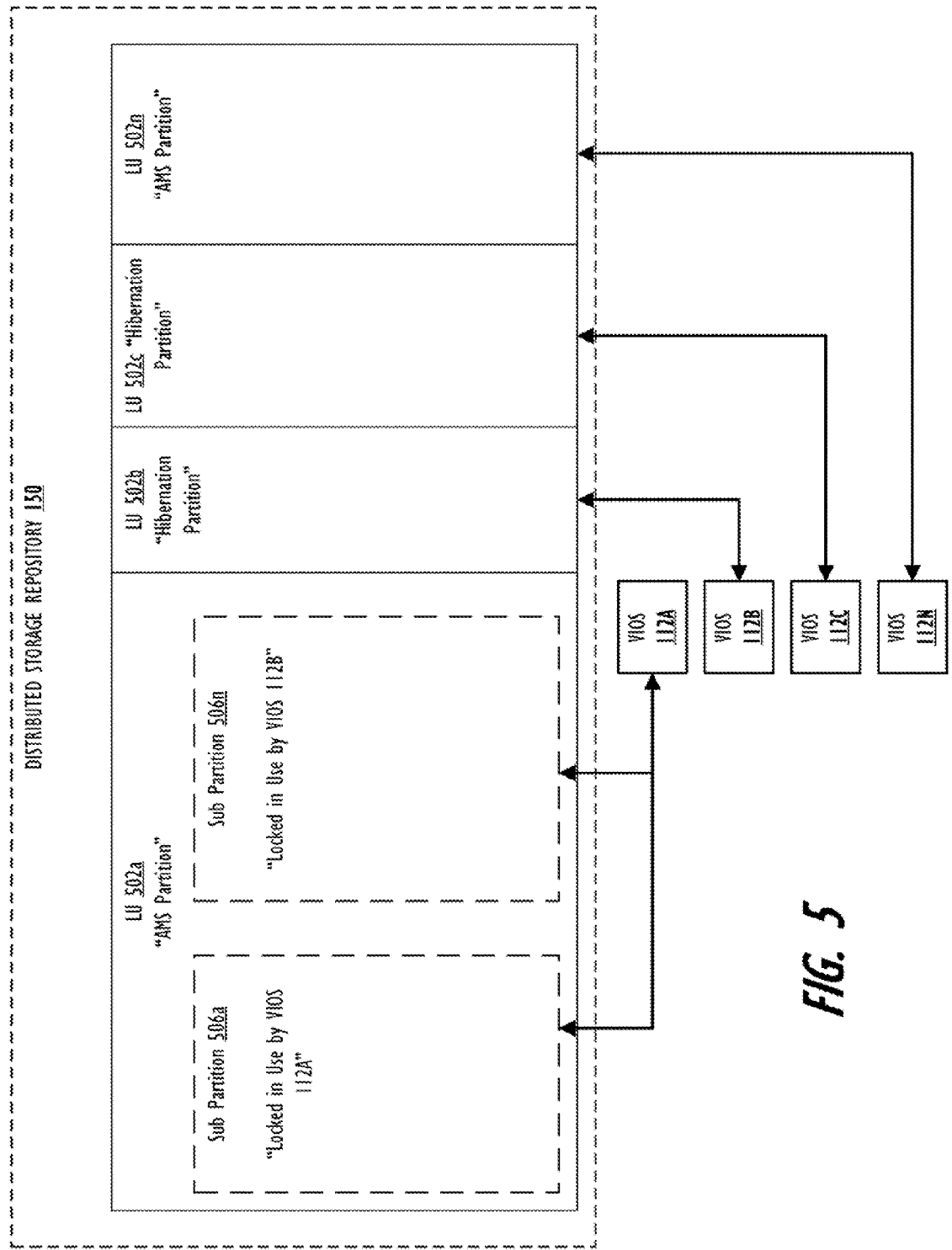
FIG. 5 is a block diagram illustrating the usage of VIOS Logical Units (LUs) as paging devices for enabling active memory sharing (AMS) for applications of a client LPAR.

FIG. 5 is a block diagram illustrating the usage of VIOS Logical Units (LUs) as paging devices for enabling active memory sharing (AMS) for applications of a client LPAR. The CA VIOS protocol builds on existing virtual SCSI (VSCSI) technology to provide distributed storage across clustered VIOS partitions. Active memory sharing (AMS) allows treating all storage on the server system as one big "virtual" memory pool with chunks of storage (partitions) LUs 502a-n allocated to respective client LPARs (e.g., LPARs 114-a-n) depending on the LPARs specific entitlement (or requirement). Specifically, AMS allows over-committing of memory at the LPAR level. In assigning this memory, there can be over-commitments, by which each LPAR has lesser memory in reality than what it thinks it has. PHYP manages this over-commitment situation by saving of unreferenced data on to a persistent storage device called "paging device". Thus, the page frames or memory images that are not currently resident on the memory allocated to the LPAR reside on a physical storage. The size of this storage needs to be at least as big as the maximum memory requested by the LPAR so that the entire memory image can fit into storage space, if required. With the cluster awareness provided as a functionality of the VIOSes within the VIOS cluster, these assigned storage devices can be LUs, in one or more embodiment. This allows for thin provisioning and sharing of the same physical device used for paging among various client LPARs. Thus the cluster-aware functionality provided by the VIOSes within the VIOS cluster allows for treating all storage on the server system as one big virtual storage space, with chunks of storage (LUs) assigned to each LPAR. In one embodiment, AMS functionality is then leveraged by making use of these LUs as paging devices such that the over-commitment can be at the storage level as well. In other word, the paging device does not need to be as large as the maximum memory of the client but can grow dynamically as the requirement grows (i.e. the paging device is thin provisioned). This allows flexibility and maximum utilization of storage resources.

In a traditional Active Memory Sharing (AMS) enabled system, each client requires a dedicated storage device (physical disk). This requires a large amount of expensive, physical storage devices, each of which may only be minimally used by the assigned client. Across a large AMS system this equates to a significant amount of wasted storage both in terms of financial cost to a provider of the AMS enabled system, and in terms of utilized disk space within the AMS enabled system.

For example, an AMS system can have only 25 GB of physical memory that is used to support 5 clients each requiring 10 GB memory. The AMS implementation recognizes that for various reasons, such as the clients only using a small portion of their assigned memory or not all clients are online at the same time, the full allotment of 50 GB is not needed to support these five clients. AMS functionality allows for overcommitting memory such that each client's provided memory may be only 5 GB in size even though the clients have requested 10 GB. Whenever a client requests data not currently in memory (data stored in the other 5 GB) a hypervisor "pages out" what is not in use from the data in memory to persistent storage and "pages in" the reference data into memory.

The AMS functionality described herein overcommits memory at the LPAR level. Each client LPAR is allocated a Logical Unit (LU) of a determined size. The size of the allocated LU may be less than the amount that is actually available to the client and is based on the memory required by software (e.g., Applications, Operating Systems) of the client LPAR.

Since a single disk can be divided into small chunks (LUs) of a smaller size (e.g, a 20 GB disk divided into smaller 2-4 GB LUs), when a client is offline the available memory previously allocated to that client that is not in use can be given by the PHYP to clients that are online, thus reducing page-in and page-outs for the online client. If a client is allowed up to 4 GB but only requires 2 GB at a specific time, the PHYP may only provide a 2 GB LU to the client. The LUs also allow thin provisioning which further reduces wasted storage. The thin provisioning feature allows for efficient use of storage by only allocating physical storage for the logical unit when the actual storage is needed. Additionally, the PHYP may dynamically increase or decrease the size of a LU as needed by a client. Since all LPARs 114a-n share storage from the same pool, the distributed storage repository is much more efficiently utilized as clients are only provided with the amount of storage they require at a given time, not what is assigned or paid for (i.e. memory storage is not "over-committed"), while still providing each requesting application/OS with persistent paging storage.

An application (e.g., Application 212) or OS of a client LPAR 114a-n submits a paging file request to a VIOS (e.g. VIOS 112a-n) or a utility executing in the VIOS (such as CM Utility 222). The paging file request indicates a minimum required capacity required for paging file operations. The minimum required capacity may be specified by the requesting application (or OS), or may be determined by a managing VIOS. The application does not need to know any other details about the physical storage. This greatly reduces the number of configuration steps by a system administrator when compared with traditional AMS systems, and also reduces the chance of user error.

Once the paging file request is received, the VIOS automatically partitions a new LU 502 from the distributed storage repository 150 and assigns the new LU 502 to the requesting application/OS of the client LPAR. Once allocated, a logical unit (LU) 502 functions as a normal paging file for input/output data for use by the requesting application/OS via VIOS 112. VIOS 112 may then autonomously direct all subsequent paging file I/O data of the requesting application/OS to the new LU 502. Each new LU 502 may be thin provisioned by the VIOS from distributed storage repository 150 to be equal to the same size as the indicated minimum required capacity required for paging file operations. For example, a logical unit of 100 MB can be created by a VIOS 112, but a client LPAR may only require 10 MB of physical storage at a given time. Thus, only 10 MB of physical storage would actually be allocated to the client LPAR. Clients LPARs 114 may be assigned a certain amount of memory, but are only provided with the amount of memory that will be effectively utilized by that client LPAR 114 at any a given moment. In an alternative embodiment, a predetermined amount of storage that is more than what is anticipated to be utilized by the requesting application/OS (such as an additional two percent storage) may be allocated to account for differences in media, such as different disk cluster sizes for a source storage, for example. After being created, the new LU 502 is assigned to the requesting client LPARs via VIOSes 112a-n and the LU 502 operates like "real memory". Each LU 502 in the distributed storage repository 150 is visible to all VIOSes 112a-n. This also provides for easy migration of LUs 502 from one CEC to another. While the LUs 502 all share the same distributed storage repository storage pool, each LU 502 is only available to one client. To ensure data is kept confidential, no two different clients are able to access or share a same LU 502.

In one embodiment, instead of creating a new LU 502, a VIOS 112 managing the requesting application/OS may also determine if memory of an existing LU 502 within the distributed storage repository 150 that is not currently utilized by a VIOS has an available amount of storage at least equal to the minimum required capacity of a received client request for memory allocation that would be suitable for use by the requesting application/OS. When an existing LU 502 meets this criterion, the VIOS assigns the existing LU 502, or a portion of the existing LU 502, to the requesting application/OS. In response to none of the existing LUs 502a-n having sufficient available space that is suitable for use by the requesting application/OS, the managing VIOS may partition a new LU 502 from available memory in the shared distributed storage repository 150. Alternatively, in one embodiment, the managing VIOS 112 may select an existing LU 502 and increase the storage capacity of the selected existing LU 502 by an amount equal to the difference between minimum required capacity and the available amount of storage of the existing LU 502. Thus, the selected existing LU 502 is resized (thin provisioned) to accommodate the storage requirements of the new paging file request, as well as the needs of each existing LPAR that is currently utilizing the selected existing LU 502. The managing VIOS 112 may then assign the existing LU 502 to the requesting LPAR as a shared paging file, and autonomously direct all subsequent paging file I/O data of the requesting application/OS to the existing LU 502.

An application that requires more storage than is currently allocated in a LU 502 is automatically allocated the additional storage required. Conversely, if storage needs should be reduced for an application/OS, the managing VIOS may autonomously shrink the size of a LU. As the number of clients increases, additional LUs 502a-n in the storage network (i.e. distributed storage repository 150) may be allocated as additional paging storage devices for access by one or more VIOSes 112a-n. In one embodiment, each LU 502a-n may be subdivided into sub partitions 506a-n. Sub partitions 506a-n are separate slices for storing system hibernation data and paging file data within a same LU 502a-n. Sub partitions 506a-n may be locked to a particular VIOS 112 or may be accessible by only one or more applications within a VIOS 112. A sub partition 506 and may be allocated as paging file storage for active memory sharing, or may be restricted only for use as a hibernation partition for a VIOS 112.

Turning now to the flowcharts, FIGS. 6A-6B illustrate various methods by which LUs may be assigned as paging files. In FIG. 6A there is depicted a high level logical flowchart of the process for creating a new LU as an active memory sharing paging file, according to one embodiment. After initiator block 602, a VIOS receives a paging file request from an application/OS of a client LPAR (block 604). The paging file request indicates a minimum required capacity, which is a minimum amount of paging file storage required by the application. Upon receiving the paging file request, the VIOS reads the minimum required capacity from the paging file request (block 606). The VIOS server then thin-provisions a new LU from distributed storage repository 150 equal to the minimum required capacity (block 608). The VIOS server then assigns the provisioned LU to the client LPAR (block 610). All subsequent paging file I/O data of the requesting application/OS are then autonomously directed and/or routed the hypervisor to the new LU (block 612). The process terminates at block 620.

FIG. 6B depicts a high level logical flowchart of the process for allocating an existing LU as an active memory sharing paging file, according to one embodiment. After initiator block 652 a VIOS receives a paging file request from an application/OS of a client LPAR (block 654). The paging file request indicates a minimum required capacity. Upon receiving the paging file request, the VIOS reads the minimum required capacity from the paging file request and determines if there is an existing LU within a plurality of existing LUs in the distributed data repository 150 that has an available amount of storage at least equal to the minimum required capacity and is currently not utilized (block 656). When there is an existing LU that has an available amount of storage which is at least equal to the minimum required capacity and is not currently utilized, the VIOS assigns the spare storage space of the existing LU as a shared paging file to the requesting application/OS (block 670). All subsequent paging file I/O data of the requesting application/OS are then autonomously directed and/or routed by the hypervisor to the existing LU (block 672). The process terminates at block 680.

When there is not an existing LU within a plurality of existing LUs in the distributed data repository that has an available amount of storage at least equal to the minimum required capacity, the VIOS selects an existing LU that is not currently utilized from the plurality of existing LUs (block 658). The VIOS then increases the storage capacity of the selected existing LU by an amount equal to the difference between the minimum required capacity and the available amount of storage of the existing LU (block 660). The VIOS assigns the selected existing LU as a shared paging file to the requesting application/OS (block 670). All subsequent paging file I/O data of the requesting application/OS are then autonomously directed and/or routed to the selected existing LU (block 672). The process terminates at block 680.

Although the methods illustrated in FIGS. 6A-6B may be described with reference to components and functionality illustrated by and described in reference to FIGS. 1-5, it should be understood that this is merely for convenience and that alternative components and/or configurations thereof can be employed when implementing the various methods. Certain portions of the methods may be completed by CM utility 222 executing on one or more (virtual) processors (CPU 205A) within CEC 110 (FIG. 1 or 2) or on processing resources of distributed storage repository 150. The executed processes then control specific operations of or on CECs 110, client LPARs 114, VIOSes 112, or distributed storage repository 150. For simplicity in describing the methods, all method processes are described from the perspective of VIOS/node 112.

D2. LU Locking and Logical Unit Redundancy

Returning now to FIG. 5, as previously disclosed, multiple VIOSes 112a-n may also share the same LU 502a-n. An LU 502a-n provisioned as a paging file provides temporary storage to each VIOS 112a-n sharing the LU 502a-n. Since VIOSes 112a-n are cluster-aware, the VIOSes 112a-n may query each other with regards to the device usage to prevent client crashes or data corruption. For example, in response to a second VIOS 112b querying a LU 502a currently utilized for processing a client I/O operation by a first VIOS 112a, first VIOS 112a may respond to the second VIOS 112b by providing specific information about the current status of the LU 502a that is currently being utilized by the first VIOS 112a. This information may include specific portions, partitions, or sectors of data which are currently utilized or allocated to LU 502a. This information is then utilized by the second VIOS 112b in order to prevent any portion of the LU 502a from being overwritten or deleted while the LU 502a is being accessed and/or utilized by the first VIOS 112a. Thus, critical hibernation data or paging data in a LU 502 that is currently being utilized cannot be accidentally overwritten, accessed, or deleted by other VIOSes 112a-n that are not servicing the same client as the first VIOS 112a.

Additionally, individual sub partitions 506a-n of a shared LU 502 may be locked by a managing VIOS 112 so that another application does not overwrite or delete data being utilized by a first application. These sub partitions 506a-n in a shared LU 502 may or may not be accessed or checked-in/checked-out via page-in and page-out requests by each of the VIOSes 112a-n sharing the shared LU 502. A firmware (e.g., FMWRE 216) may manage the memory in AMS in a secure manner and send read or write requests to the VIOSes 112a-n using a Virtual Asynchronous Services Interface (VASI) for both AMS and partition hibernation. The VIOS is able to appropriately route the I/O data in and out of the LU 502 while providing protection against currently utilized data from being deleted or overwritten inadvertently. The VIOS may also verify the identity and access permissions of a client before "unlocking" paging file or hibernation data.

Figure 7:
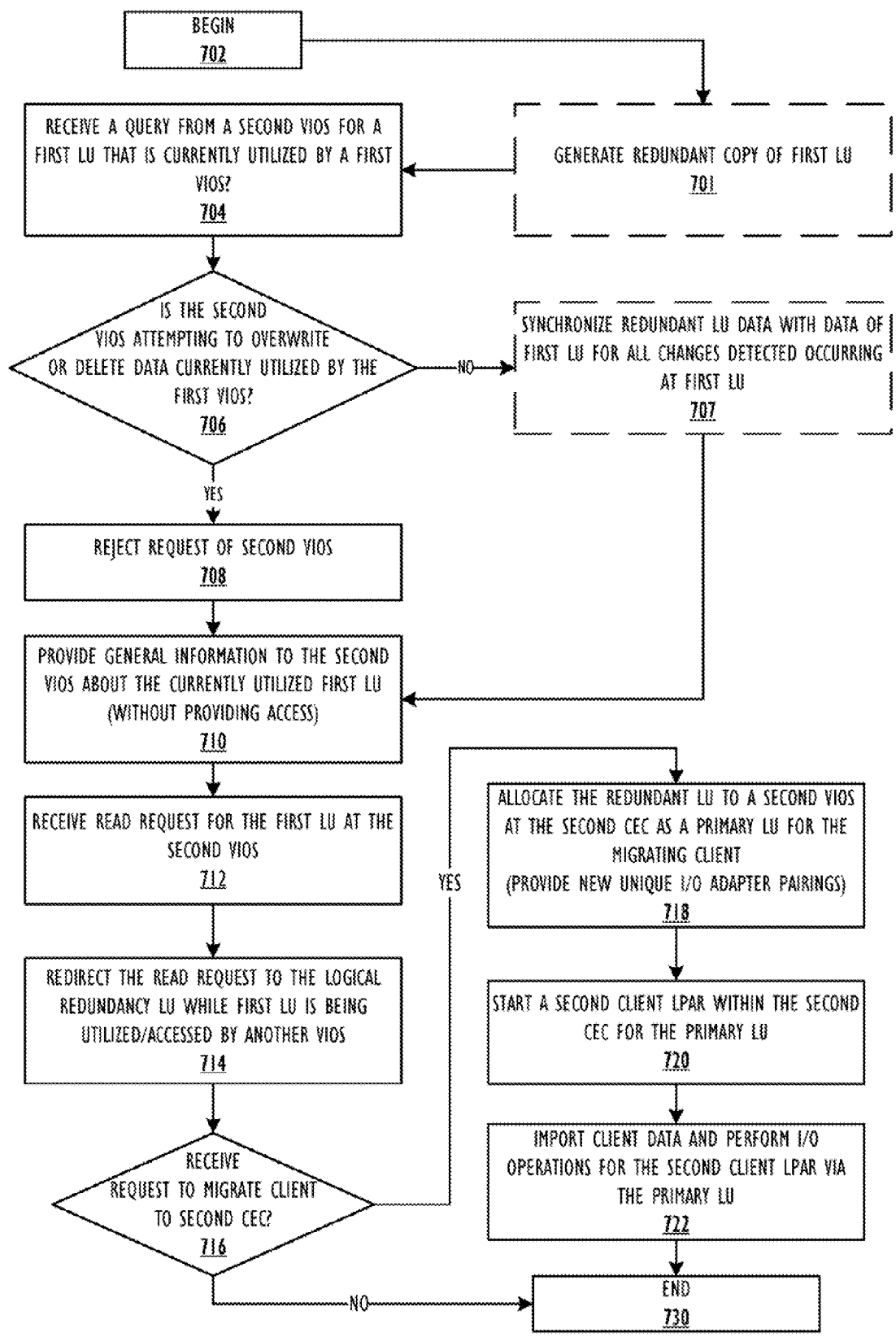
FIG. 7 is a high-level logical flowchart of an exemplary method for providing information to a second VIOS that is querying data currently utilized by a first VIOS, according to one embodiment.

In another embodiment, a logical redundancy partition of a LU may also be created (generally illustrated within FIG. 7, block 701). The logical redundancy partition is a second LU that is a dynamic copy of a first LU. For both AMS and hibernation applications, and also for Remote Access Service (RAS) applications, a redundant configuration allows a first LU to be accessible from one or more paging VIOSes. Each change in a first LU is autonomously/dynamically echoed in real-time to a logical redundancy LU (redundant LU). If a portion of data in a first LU is locked by a first VIOS, a second VIOS may instead redirect a read request to the logical redundancy LU (since the second LU is a dynamic, up-to-date copy of the first LU and therefore contains the same data). In this embodiment, a second VIOS can simultaneously access the same data being utilized by the first VIOS without having to wait for the first VIOS to "unlock" the first logical unit. In one or more embodiments, the logical redundancy LU may be restricted to read-only access (with the exception of the periodic synchronization/redundancy operations), in order to prevent changes to the redundant LU (redundant copy of data being overwritten) unless/until those changes occur in the primary (first) LU. In one or more embodiments, access to the first LU and the second LU may be controlled within the VIOS cluster by each VIOS tracking the lock status of a LU that the VIOS is attempting to access before proceeding with such access. Thus, for example, a first VIOS that has a client request directed at the first LU assigned to that client checks with a "LU status table" within distributed storage repository 150 or, in an alternate embodiment, within VIOS DB 140 or some other shared storage. The first VIOS locks the LU when the LU is not currently locked. When a second VIOS has an I/O request that targets the same first LU, the second VIOS checks the LU status table and receives notification that the first LU is currently locked. However, if the request is a read request, the VIOS may retrieve the location of the second redundant LU, complete a security verification process (e.g., to ensure the I/O adapter information matches the original I/O adapter information), and once verification is confirmed, the second VIOS can then access the redundant LU and read the data from the redundant LU. This embodiment can be enabled when the LU is a shared LU that contains data for a plurality of different clients.

Additionally, this functionality may be extended to enable seamless migration of a client LPAR to another CEC. A VIOS may receive a request to migrate a first client LPAR having an allocated LU and a logical redundancy LU that is an exact copy of the allocated LU (including the I/O adapters and other settings (except the write-to access setting), in one embodiment) of a first CEC to a second CEC that is different from the first CEC. Responsive to receiving the migration request, the logical redundancy LU is allocated as a primary LU to a second VIOS within the second CEC. The second VIOS may then start/restart a second client LPAR for the client within the second CEC. I/O operations of the second client LPAR are then performed/managed by the second VIOS at the new primary LU of the second VIOS (the former logical redundancy LU of the first allocated LU).

With reference now to FIG. 7, there is depicted a high-level logical flowchart of an exemplary method for providing information to a second VIOS that is querying data currently utilized by a first VIOS of a first CEC, according to one embodiment. The dashed blocks illustrate a redundancy operation that can be optionally implemented, in one or more embodiments. After initiator block 702, the redundant copy of the first LU is generated (block 701). Following, a second VIOS queries a first LU that is currently utilized by a first VIOS (block 704). A determination is then made if the second VIOS is attempting to overwrite or delete data in the first LU that is currently utilized by the first VIOS (block 706). If the second VIOS is not attempting to overwrite or delete data in the first LU that is currently utilized by the first VIOS the process continues to block 710. In the redundancy embodiments, as the first VIOS makes modifications/changes to the first LU, those changes are dynamically reflected within the redundant LU (707), such that both the first LU and the redundant LU have synchronized data.

When the second VIOS is attempting to overwrite or delete data in the paging file that is currently utilized by the first VIOS, the request of the second VIOS is rejected (block 708). At block 710, information of the first VIOS that is currently utilized is provided to the second VIOS by the first VIOS. A read request is then received at a second VIOS for the first LU currently utilized by the first VIOS (block 712). Responsive to receiving the read request for the first LU, the second VIOS autonomously redirects the read request to the logical redundancy LU for the first LU (block 714). A determination is then made if a request to migrate the first client LPAR to a second CEC that is different from the first CEC (block 716). When the determination is made that a migration request has not been received, the process terminates at block 730.

In response to a determination being made that a migration request has been received, the logical redundancy LU is allocated to a new client LPAR on the second VIOS (located within the second CEC) as a primary LU (block 718). A new I/O adapter paring is established with the virtual I/O adapters of the second VIOS that is assigned to the new client LPAR and the server I/O adapter linked to the redundant LU. The write-to access permission of the redundant LU is modified to allow both read and write access by one or more VIOSes. The second VIOS then starts/restarts a second client LPAR within the second CEC (block 720). Finally, at block 722 subsequent I/O operations of the second client LPAR are performed by the second VIOS at the primary LU (formerly logical redundancy LU). The process then terminates at block 730.

Although the method illustrated in FIG. 7 may be described with reference to components and functionality illustrated by and described in reference to FIGS. 1-5, it should be understood that this is merely for convenience and that alternative components and/or configurations thereof can be employed when implementing the various methods. Certain portions of the methods may be completed by CM utility 222 executing on one or more (virtual) processors (CPU 205A) within CEC 110 (FIG. 1 or 2) or on processing resources of distributed storage repository 150. The executed processes then control specific operations of or on CECs 110, client LPARs 114, VIOSes 112, or distributed storage repository 150. For simplicity in describing the methods, all method processes are described from the perspective of VIOS/node 112.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having a processor, a memory coupled to the processor, at least one input/output (I/O) adapter that enables connection to an external network with a shared storage repository, and a virtualization management component executing within the data processing system to generate a plurality of operating system (OS) partitions including one or more virtual input/output (I/O) server (VIOS) and one or more client logical partitions (LPAR), a method comprising:
   providing, by a first VIOS, a virtual memory space of a distributed storage repository, wherein the virtual memory space is actively shared by two or more client LPARs;
   the first VIOS receiving a paging file request from an application running on a first client LPAR of the two or more client LPARs, wherein the paging file request indicates a minimum required capacity, and wherein the minimum required capacity is a minimum amount of paging file storage required by the application;
   determining if an existing logical unit (LU) of a plurality of LUs within the distributed storage repository has an available amount of storage equal to or greater than the minimum required capacity and is not currently being utilized for I/O processing by a VIOS;
   in response to determining that the existing LU has an available amount of storage that is at least equal to the minimum required capacity and is not currently being utilized, assigning the existing LU to the first LPAR as a shared paging file; and
   the first VIOS autonomously directing all subsequent paging file requests of the application to available storage within the existing LU.

2. The method of claim 1, further comprising autonomously maintaining a logical redundancy LU of an allocated LU, wherein the logical redundancy LU is a dynamic copy of the allocated LU that is autonomously updated responsive to any changes within the allocated LU.

3. The method of claim 2, further comprising:
   receiving a query by a second VIOS for access to the allocated LU; and
   in response to the receiving the query while the shared paging file is being utilized by the first VIOS to perform I/O operations of the first client LPAR:
      providing the second VIOS with storage information about the allocated LU,
      receiving a read request for the allocated LU, and
      in response to receiving the read request for the allocated LU, the second VIOS autonomously redirecting the read request to the logical redundancy LU.

4. The method of claim 2, further comprising:
   receiving a request to migrate the first client LPAR having the allocated LU and a logical redundancy LU of a first computing electronic complex (CEC) to a second CEC that is different from the first CEC;
   allocating, as a primary LU, the logical redundancy LU to a second VIOS, wherein the second VIOS is located within the second CEC;
   starting a second client LPAR within the second CEC; and
   the second VIOS performing I/O operations of the second client LPAR at the primary LU.

5. The method of claim 1, further comprising;
   in response to determining that no existing LU of the plurality of LUs has an available amount of storage that is at least equal to the minimum required capacity:
      the first VIOS thin-provisioning a new logical unit (LU) within the distributed storage repository, wherein the allocated capacity of the new LU is equal to the minimum required capacity;
      the first VIOS assigning the new LU to the first LPAR as a shared paging file; and the first VIOS autonomously directing all subsequent paging file I/O data of the application to the new LU.

6. The method of claim 1, further comprising:
in response to determining that no existing LU of the plurality of LUs has an available amount of storage that is at least equal to the minimum required capacity:
selecting an existing LU that is not currently in-use from the plurality of LUs, wherein the existing LU has an available amount of storage less than the minimum required capacity; and
autonomously increasing the storage capacity of the existing LU by at least the difference of the minimum required capacity and the available amount of storage within the existing LU.

7. The method of claim 1, wherein a portion of data stored in the shared paging file is accessed via page-in and page-out requests.

8. A computing electronic complex comprising:
a processor;
an input/output (I/O) interface coupled to an external network; and
a memory coupled to said processor, wherein said memory includes:
a hypervisor;
a plurality of operating system (OS) partitions; and
at least one virtual input/output (I/O) server (VIOS) processing logic executing on the processor for enabling the computing electronic complex (CEC) to:
provide, by a first VIOS, a virtual memory space of a distributed storage repository, wherein the virtual memory space is actively shared by two or more client LPARs;
the first VIOS receiving a paging file request from an application running on a first client LPAR of the two or more client LPARs, wherein the paging file request indicates a minimum required capacity, and wherein the minimum required capacity is a minimum amount of paging file storage required by the application;
determine if an existing logical unit (LU) of a plurality of LUs within the distributed storage repository has an available amount of storage equal to or greater than the minimum required capacity and is not currently being utilized for I/O processing by a VIOS;
in response to determining that the existing LU has an available amount of storage that is at least equal to the minimum required capacity and is not currently being utilized, assign the existing LU to the first LPAR as a shared paging file; and
the first VIOS autonomously directing all subsequent paging file requests of the application to available storage within the existing LU.

9. The computing electronic complex of claim 8, the processing logic further comprising logic that causes the CEC to:
autonomously maintain a logical redundancy LU of an allocated LU, wherein the logical redundancy LU is a dynamic copy of the allocated LU that is autonomously updated responsive to any changes within the allocated LU.

10. The computing electronic complex of claim 9, the processing logic further enabling the CEC to:
receive a query by a second VIOS for access to the allocated LU; and
in response to the receiving the query while the shared paging file is being utilized by the first VIOS to perform I/O operations of the first client LPAR:
provide the second VIOS with storage information about the allocated LU,
receive a read request for the allocated LU; and
in response to receiving the read request for the allocated LU, the second VIOS autonomously redirecting the read request to the logical redundancy LU.

11. The computing electronic complex of claim 9, the processing logic further enabling the CEC to:
receive a request to migrate the first client LPAR having the allocated LU and a logical redundancy LU of a first computing electronic complex (CEC) to a second CEC that is different from the first CEC;
allocate, as a primary LU, the logical redundancy LU to a second VIOS, wherein the second VIOS is located within the second CEC;
start a second client LPAR within the second CEC; and
the second VIOS performing I/O operations of the second client LPAR at the primary LU.

12. The computing electronic complex of claim 8, the processing logic further comprising logic for:
in response to determining that no existing LU of the plurality of LUs has an available amount of storage that is at least equal to the minimum required capacity:
the first VIOS thin-provisioning a new logical unit (LU) within the distributed storage repository, wherein the allocated capacity of the new LU is equal to the minimum required capacity;
the first VIOS assigning the new LU to the first LPAR as a shared paging file; and
the first VIOS autonomously directing all subsequent paging file I/O data of the application to the new LU.

13. The computing electronic complex of claim 8, the processing logic further comprising logic for causing the CEC to:
in response to determining that no existing LU of the plurality of LUs has an available amount of storage that is at least equal to the minimum required capacity:
select an existing LU that is not currently in-use from the plurality of LUs, wherein the existing LU has an available amount of storage less than the minimum required capacity; and
autonomously increase the storage capacity of the existing LU by at least the difference of the minimum required capacity and the available amount of storage within the existing LU.

14. The computing electronic complex of claim 8, wherein a portion of data stored in the shared paging file is accessed via page-in and page-out requests.

15. A computer program product comprising:
a non-transitory computer readable storage medium; and
program code on said non-transitory computer storage medium that when executed by a processor within a cluster-aware data processing system provides a plurality of functions comprising:
providing, by a first VIOS, a virtual memory space of a distributed storage repository, wherein the virtual memory space is actively shared by two or more client LPARs;
the first VIOS receiving a paging file request from an application running on a first client LPAR of the two or more client LPARs, wherein the paging file request indicates a minimum required capacity, and wherein the minimum required capacity is a minimum amount of paging file storage required by the application;
determining if an existing logical unit (LU) of a plurality of LUs within the distributed storage repository has an available amount of storage equal to or greater than the minimum required capacity and is not currently being utilized for I/O processing by a VIOS;

in response to determining that the existing LU has an available amount of storage that is at least equal to the minimum required capacity and is not currently being utilized, assigning the existing LU to the first LPAR as a shared paging file, and the first VIOS autonomously directing all subsequent paging file requests of the application to available storage within the existing LU.

16. The computer program product of claim 15, the program code further comprising code for autonomously maintaining a logical redundancy LU of an allocated LU, wherein the logical redundancy LU is a dynamic copy of the allocated LU that is autonomously updated responsive to any changes within the allocated LU.

17. The computer program product of claim 16, the program code further comprising code for:

receiving a query by a second VIOS for access to the allocated LU; and in response to the receiving the query while the shared paging file is being utilized by the first VIOS to perform I/O operations of the first client LPAR:

providing the second VIOS with storage information about the allocated LU, receiving a read request for the allocated LU, and in response to receiving the read request for the allocated LU, the second VIOS autonomously redirecting the read request to the logical redundancy LU.

18. The computer program product of claim 15, the program code further comprising code for:

receiving a request to migrate the first client LPAR having the allocated LU and a logical redundancy LU of a first computing electronic complex (CEC) to a second CEC that is different from the first CEC;

allocating, as a primary LU, the logical redundancy LU to a second VIOS, wherein the second VIOS is located within the second CEC;

starting a second client LPAR within the second CEC; and the second VIOS performing I/O operations of the second client LPAR at the primary LU.

19. The computer program product of claim 15, the program code further comprising code for:

in response to determining that no existing LU of the plurality of LUs has an available amount of storage that is at least equal to the minimum required capacity:

the first VIOS thin-provisioning a new logical unit (LU) within the distributed storage repository, wherein the allocated capacity of the new LU is equal to the minimum required capacity;

the first VIOS assigning the new LU to the first LPAR as a shared paging file; and the first VIOS autonomously directing all subsequent paging file I/O data of the application to the new LU.

20. The computer program product of claim 15, the program code further comprising code for:

in response to determining that no existing LU of the plurality of LUs has an available amount of storage that is at least equal to the minimum required capacity:

selecting an existing LU that is not currently in-use from the plurality of LUs, wherein the existing LU has an available amount of storage less than the minimum required capacity; and autonomously increasing the storage capacity of the existing LU by at least the difference of the minimum required capacity and the available amount of storage within the existing LU.

\* \* \* \* \*